(12) United States Patent
Cheng

(10) Patent No.: US 11,111,863 B2
(45) Date of Patent: Sep. 7, 2021

(54) AUTOMATIC FUEL ECONOMIZER FOR INTERNAL COMBUSTION ENGINE

(71) Applicant: Ming-Hung Cheng, Xiushui Township (TW)

(72) Inventor: Ming-Hung Cheng, Xiushui Township (TW)

(*) Notice: Subject to any disclaimer, the term of this patent is extended or adjusted under 35 U.S.C. 154(b) by 0 days.

(21) Appl. No.: 17/038,054

(22) Filed: Sep. 30, 2020

(65) Prior Publication Data

US 2021/0131362 A1    May 6, 2021

(30) Foreign Application Priority Data

Nov. 1, 2019    (TW) .................. 108139781

(51) Int. Cl.
*F02D 41/00*    (2006.01)
*F02B 33/34*    (2006.01)

(52) U.S. Cl.
CPC .......... *F02D 41/0002* (2013.01); *F02B 33/34* (2013.01)

(58) Field of Classification Search
CPC ............................. F02D 41/0002; F02B 33/34
See application file for complete search history.

(56) References Cited

U.S. PATENT DOCUMENTS

| | | | |
|---|---|---|---|
| 9,555,751 B1* | 1/2017 | Cheng | F02D 41/0007 |
| 10,767,578 B2 | 9/2020 | Cheng | |
| 2011/0180036 A1* | 7/2011 | Chuang | F02B 39/10 |
| | | | 123/361 |
| 2012/0291749 A1* | 11/2012 | Chuang | F02D 41/0007 |
| | | | 123/337 |
| 2015/0211423 A1* | 7/2015 | Chuang | F02B 39/10 |
| | | | 701/103 |
| 2020/0003138 A1* | 1/2020 | Cheng | F02B 39/16 |

\* cited by examiner

*Primary Examiner* — Sizo B Vilakazi
(74) *Attorney, Agent, or Firm* — Karin L. Williams; Alan D. Kamrath; Mayer & Williams PC

(57) ABSTRACT

A fuel economizer for an internal combustion engine includes a computer assembly, a battery, an operation setting system, a lead sensing fan, and an air intake fan motor. The lead sensing fan is mounted on the front of the traffic vehicle. The air intake fan motor is connected to an air inlet port of the internal combustion engine. The lead sensing fan is rotated during movement of the traffic vehicle. When the rotation speed of the lead sensing fan reaches a preset value, the lead sensing fan transmits a signal to the computer assembly which regulates the rotation speed of the air intake fan motor according to a speed grade preset by the operation setting system so as to control the air flow rate of the air inlet port of the internal combustion engine.

6 Claims, 4 Drawing Sheets

FIG · 1

AUTOMATIC FUEL ECONOMIZER FOR INTERNAL COMBUSTION ENGINE

BACKGROUND OF THE INVENTION

1. Field of the Invention

The present invention relates to an economizer and, more particularly, to an automatic fuel economizer for an internal combustion engine.

2. Description of the Related Art

A conventional energy saving device for an internal combustion engine was disclosed in the Taiwanese Patent Publication No. M567307, and comprises a control box, a battery, an operation setting system, a lead sensing fan, and an air intake fan motor. The control box includes an IC (integrated circuit) board. The operation setting system is electrically connected with the IC board of the control box, and includes an operation setting monitor which presets a plurality of ranges according to a car speed and an air flow rate of the air intake fan motor. The lead sensing fan includes a first car speed sensor for a car propeller shaft, a second car speed sensor for an ABS brake system, a third car speed sensor for an EBS brake system, a fourth car speed sensor for a PDF spark ignition system, and a fifth car speed sensor for a GPS. The lead sensing fan is provided with an IC (integrated circuit) chip which is electrically connected with the IC board of the control box. The IC chip of the lead sensing fan identifies a car speed information detected by the first car speed sensor, the second car speed sensor, the third car speed sensor, the fourth car speed sensor, and the fifth car speed sensor, and transmits the car speed information to the IC board of the control box. The IC board of the control box controls the rotation speed of the air intake fan motor according to the car speed ranges preset by the operation setting system. However, it is necessary to in turn assemble multiple car speed sensors in the car so as to receive and identify the car speed information detected by the car propeller shaft, the ABS brake system, the EBS brake system, the PDF spark ignition system, and the GPS, thereby causing difficulty and inconvenience in assembly of the lead sensing fan. Thus, the multiple car speed sensors of the lead sensing fan are mounted in the car by professional technicians so that the user cannot assemble the lead sensing fan individually.

BRIEF SUMMARY OF THE INVENTION

The primary objective of the present invention is to provide an automatically controlled fuel economizer for an internal combustion engine.

In accordance with the present invention, there is provided a fuel economizer for an internal combustion engine, comprising a computer assembly, a battery, an operation setting system, a lead sensing fan, and an air intake fan motor. The computer assembly includes an IC (integrated circuit) board. The IC board of the computer assembly is electrically connected with the battery, the operation setting system, the lead sensing fan, and the air intake fan motor. The battery provides an electric power to the air intake fan motor. The operation setting system includes an operation setting monitor. The operation setting monitor of the operation setting system presets a plurality of grades according to a rotation speed of the lead sensing fan and an air flow rate of the air intake fan motor. The rotation speed of the lead sensing fan is proportion to a speed of a traffic vehicle. The operation setting system is provided with a manual/auto switching button, an increase button, and a decrease button. The operation setting system presets that a rotation speed of the air intake fan motor increases the air flow rate of the air intake fan motor by a grade when the speed of the traffic vehicle is increased by a predetermined value. The air intake fan motor is connected to an air inlet port of the internal combustion engine. The air intake fan motor drives and rotates an air intake fan, to control an air flow rate of the air inlet port of the internal combustion engine. The lead sensing fan is mounted on a front position of the traffic vehicle. The lead sensing fan includes an IC (integrated circuit) chip. The IC chip of the lead sensing fan is electrically connected with the IC board of the computer assembly. The lead sensing fan is rotated during movement of the traffic vehicle. When the rotation speed of the lead sensing fan reaches a preset value, the IC chip of the lead sensing fan transmits a signal to the computer assembly, and the computer assembly regulates the rotation speed of the air intake fan motor according to a speed grade preset by the operation setting system so as to control the air flow rate of the air inlet port of the internal combustion engine.

According to the primary advantage of the present invention, the computer assembly regulates the rotation speed of the air intake fan motor according to the speed grade preset by the operation setting system so as to control the air flow rate of the air inlet port of the internal combustion engine, thereby achieving the purpose of saving the fuel.

According to another advantage of the present invention, the fuel economizer efficiently increases the air intake amount of the internal combustion engine, without increasing the rotation speed of the internal combustion engine, and without increasing the fuel injection amount, such that the fuel is burned completely, thereby preventing the internal combustion engine from producing carbon deposit, and thereby enhancing the working efficiency of the internal combustion engine.

According to a further advantage of the present invention, the car travels a longer distance under the same fuel volume, so as to achieve the energy-saving purpose.

According to a further advantage of the present invention, the fuel economizer is assembled easily, quickly, and conveniently, so that the user can assemble and mount the fuel economizer by himself/herself.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
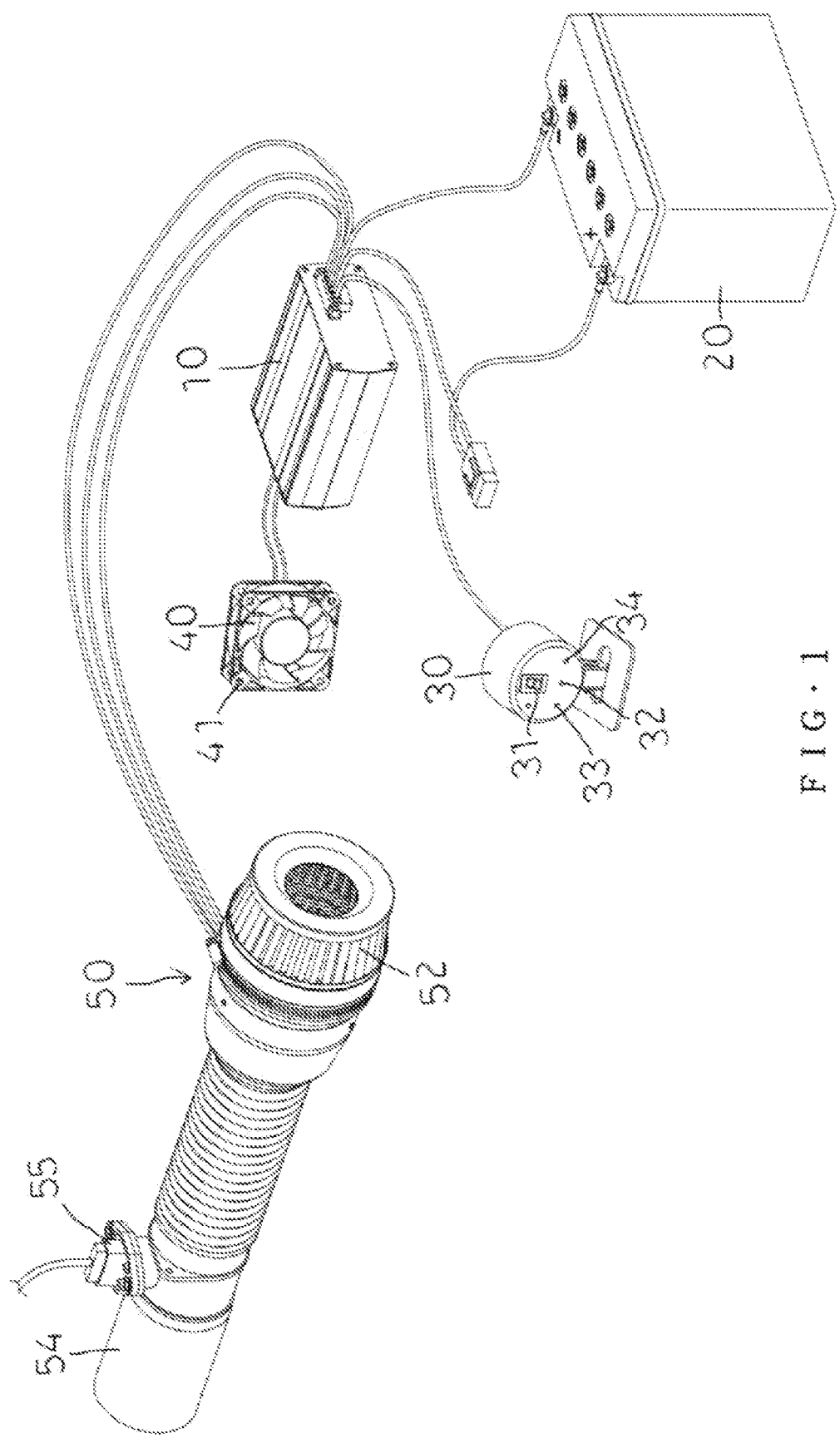
FIG. 1 is a perspective view of a fuel economizer for an internal combustion engine in accordance with the preferred embodiment of the present invention.
Figure 2:
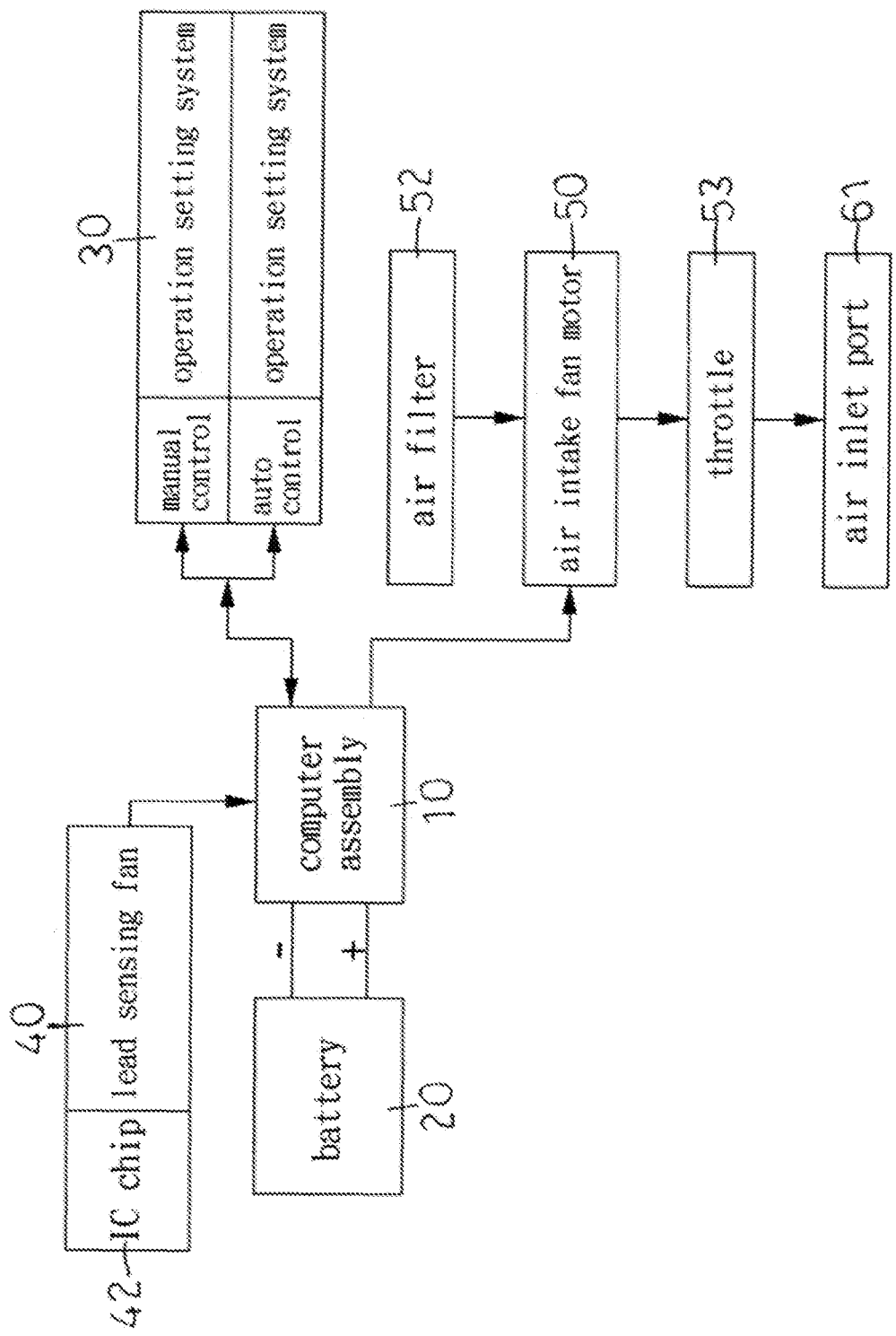
FIG. 2 is a block diagram of the fuel economizer for an internal combustion engine in accordance with the preferred embodiment of the present invention.
Figure 3:
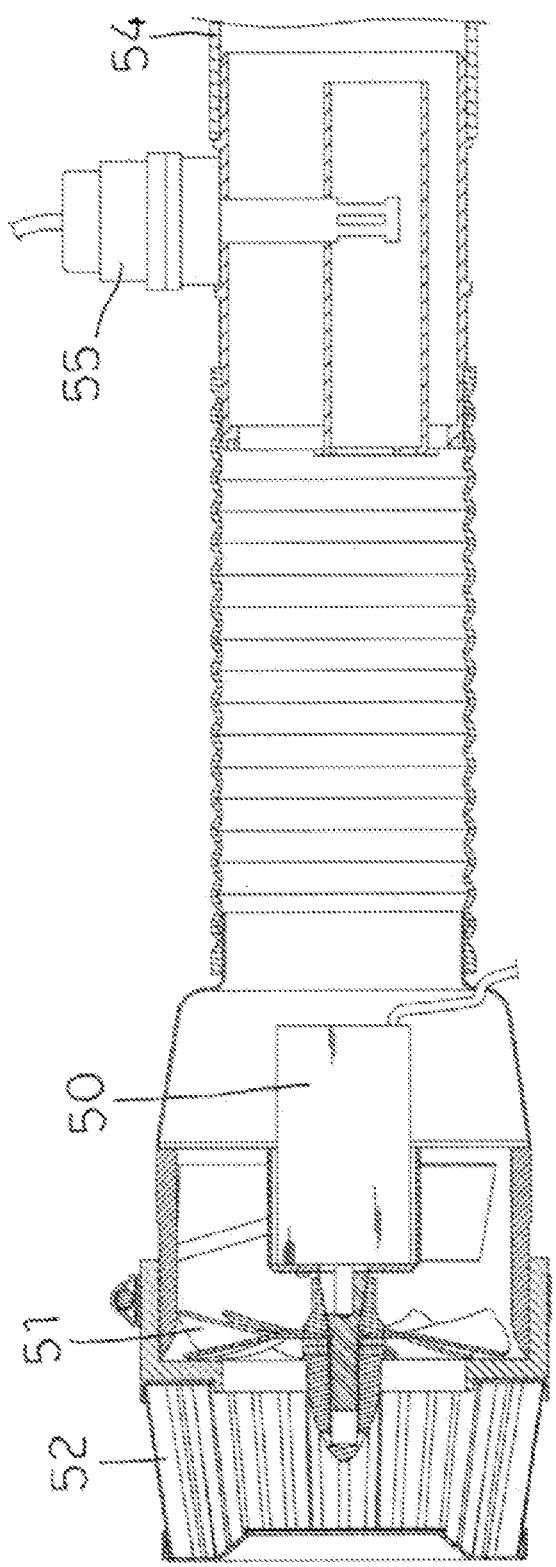
FIG. 3 is a cross-sectional view of an air intake fan motor of the fuel economizer in accordance with the preferred embodiment of the present invention.
Figure 4:
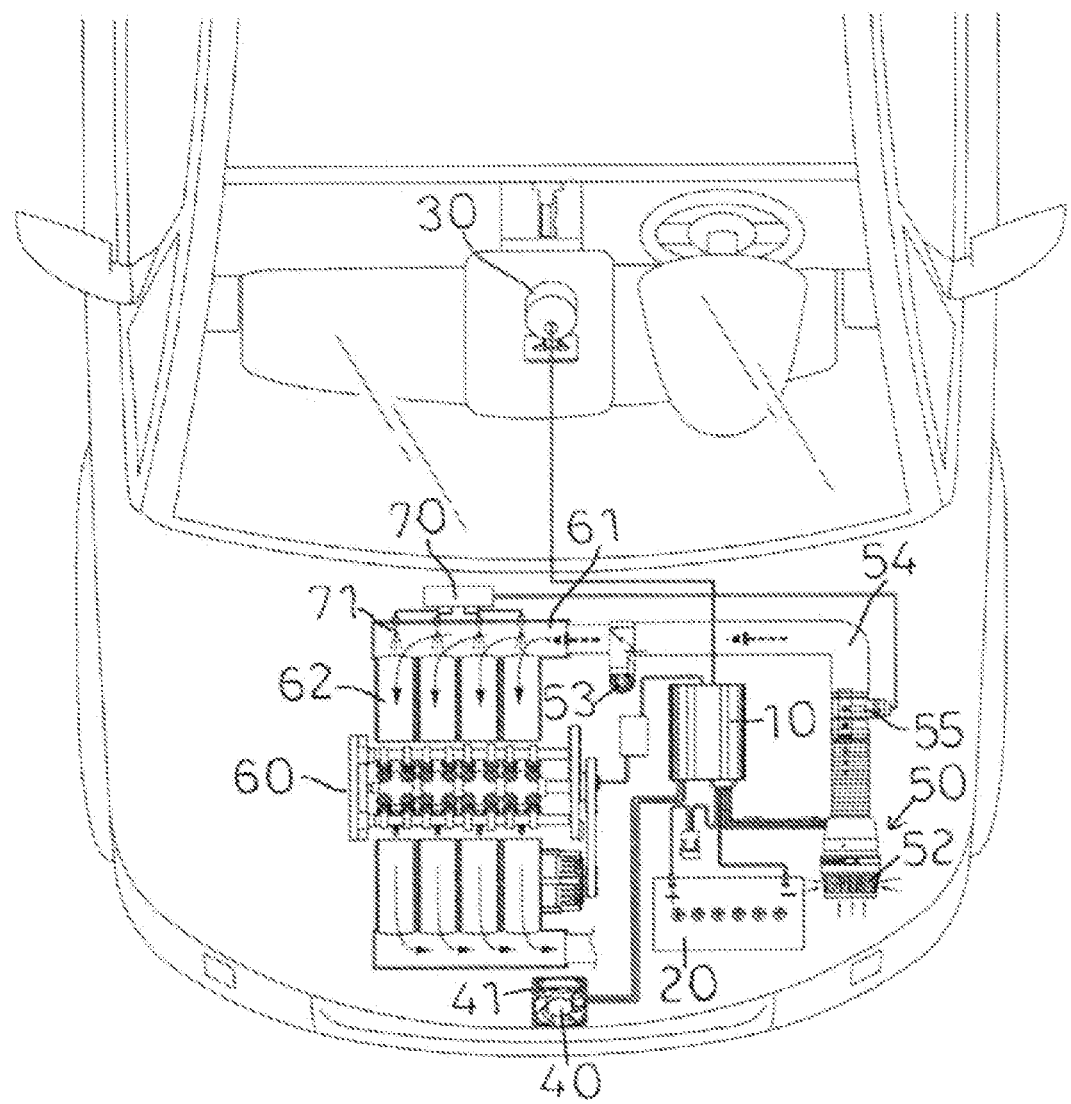
FIG. 4 is a schematic operational view of the fuel economizer in accordance with the preferred embodiment of the present invention.

Referring to FIGS. 1-4, an automatic fuel economizer for an internal combustion engine in accordance with the preferred embodiment of the present invention comprises a computer assembly 10, a battery 20, an operation setting system 30, a lead (or guide) sensing fan 40, and an air intake fan motor 50.

The computer assembly 10 includes an IC (integrated circuit) board. The IC board of the computer assembly 10 is electrically connected with the battery 20, the operation setting system 30, the lead sensing fan 40, and the air intake fan motor 50.

The battery 20 is electrically connected with the IC board of the computer assembly 10, to provide an electric power to the air intake fan motor 50 so as actuate the air intake fan motor 50. Preferably, the battery 20 is a car battery.

The operation setting system 30 is electrically connected with the IC board of the computer assembly 10, and includes an operation setting monitor (or display or screen) 31. The operation setting monitor 31 of the operation setting system 30 presets a plurality of grades (or ranges or degrees or levels or intervals) according to a rotation speed of the lead sensing fan 40 and an air flow rate (or air volume) of the air intake fan motor 50. The rotation speed of the lead sensing fan 40 is proportion to a speed of a traffic vehicle (or transportation). The operation setting system 30 is provided with a manual/auto switching button 32, an increase button 33, and a decrease button 34. The manual/auto switching button 32 is located under the operation setting monitor 31. The increase button 33 and the decrease button 34 are located at two sides of the manual/auto switching button 32. The increase button 33 and the decrease button 34 are operated when the manual/auto switching button 32 is disposed at a manual control state. Thus, the operation setting system 30 presets that a rotation speed of the air intake fan motor 50 increases the air flow rate of the air intake fan motor 50 by a grade when the speed of the traffic vehicle is increased by a predetermined value.

In practice, when the operation setting system 30 is switched by the manual/auto switching button 32 to an auto control mode, the rotation speed of the lead sensing fan 40 and the air flow rate of the air intake fan motor 50 are preset according to the data that are built in the IC board of the computer assembly 10 previously. Alternatively, when the operation setting system 30 is switched by the manual/auto switching button 32 to a manual control mode, the rotation speed of the lead sensing fan 40 and the air flow rate of the air intake fan motor 50 are preset by the user. Thus, the grades of the car speed preset by the operation setting system 30 is controlled manually by the user.

The air intake fan motor 50 is electrically connected with the IC board of the computer assembly 10. The air intake fan motor 50 is connected to an air inlet port 61 of the internal combustion engine 60. The air intake fan motor 50 drives and rotates an air intake fan 51, to control an air flow rate of the air inlet port 61 of the internal combustion engine 60. An air filter 52 is mounted in the air intake fan motor 50 and located in front of the air intake fan 51. An air inlet pipe 54 has a first end connected to the air inlet port 61 of the internal combustion engine 60 and a second end connected to the air intake fan motor 50. The air inlet pipe 54 is provided with an air intake flow rate detector 55 and a throttle (or air regulator) 53. The air intake flow rate detector 55 is electrically connected with a fuel injection supply device 70. The fuel injection supply device 70 includes a plurality of fuel injection pipes 71 which are connected with a plurality of fuel inlet ports 62 of the internal combustion engine 60. Thus, the air intake flow rate detector 55 detects the flow rate of the inlet air, and transmits a signal to the fuel injection supply device 70, such that the fuel injection supply device 70 injects a fuel of a predetermined amount.

The lead sensing fan 40 is mounted on a front position of the traffic vehicle. The lead sensing fan 40 includes an IC (integrated circuit) chip 42. The IC chip 42 of the lead sensing fan 40 is electrically connected with the IC board of the computer assembly 10. The lead sensing fan 40 is rotated during movement of the traffic vehicle. When the rotation speed of the lead sensing fan 40 reaches a preset value, the IC chip 42 of the lead sensing fan 40 transmits a signal to the computer assembly 10, and the computer assembly 10 regulates the rotation speed of the air intake fan motor 50 according to a speed grade preset by the operation setting system 30 so as to control the air flow rate of the air inlet port 61 of the internal combustion engine 60.

In the preferred embodiment of the present invention, the traffic vehicle is a car.

In the preferred embodiment of the present invention, the traffic vehicle is a ship.

In the preferred embodiment of the present invention, the lead sensing fan 40 is mounted in a fixture 41. The fixture 41 is mounted on a front bumper or a hood of the traffic vehicle.

In the preferred embodiment of the present invention, the operation setting monitor 31 of the operation setting system 30 presets that the rotation speed of the air intake fan motor 50 increases the air flow rate by a grade when the speed of the traffic vehicle is increased by ten kilometers per hour (10 km/hr).

In another preferred embodiment of the present invention, the operation setting monitor 31 of the operation setting system 30 presets that the rotation speed of the air intake fan motor 50 increases the air flow rate by a grade when the speed of the traffic vehicle is increased by fifteen kilometers per hour (15 km/hr).

In operation, the operation setting monitor 31 of the operation setting system 30 presets that the rotation speed of the air intake fan motor 50 increases the air flow rate by a grade when the car speed is increased by 10 km/hr.

In practice, the operation setting monitor 31 of the operation setting system 30 presets thirteen grades as follows.

The first grade includes the car speed in the range of 10-20 km/hr.

The second grade includes the car speed in the range of 20-30 km/hr.

The third grade includes the car speed in the range of 30-40 km/hr.

The fourth grade includes the car speed in the range of 40-50 km/hr.

The fifth grade includes the car speed in the range of 50-60 km/hr.

The sixth grade includes the car speed in the range of 60-70 km/hr.

The seventh grade includes the car speed in the range of 70-80 km/hr.

The eighth grade includes the car speed in the range of 80-90 km/hr.

The ninth grade includes the car speed in the range of 90-100 km/hr.

The tenth grade includes the car speed in the range of 100-110 km/hr.

The eleventh grade includes the car speed in the range of 110-120 km/hr.

The twelfth grade includes the car speed in the range of 120-130 km/hr.

The thirteenth grade includes the car speed in the range of 130-140 km/hr.

Thus, when the car speed is increased by 10 km/hr, the grade is increased by one.

In such a manner, when the car is moving forward, the lead sensing fan 40 is rotated with movement of the traffic vehicle. When the car speed is increased, the rotation speed of the lead sensing fan 40 is also increased to correspond to the car speed. When the rotation speed of the lead sensing fan 40 reaches the preset value, the IC chip 42 of the lead sensing fan 40 transmits a signal to the computer assembly 10, and the computer assembly 10 regulates the rotation speed of the air intake fan motor 50 according to the speed grade preset by the operation setting system 30 so as to control the air flow rate of the air inlet port 61 of the internal combustion engine 60.

Accordingly, the computer assembly 10 regulates the rotation speed of the air intake fan motor 50 according to the speed grade preset by the operation setting system 30 so as to control the air flow rate of the air inlet port 61 of the internal combustion engine 60, thereby achieving the purpose of saving the fuel. In addition, the fuel economizer efficiently increases the air intake amount of the internal combustion engine 60, without increasing the rotation speed of the internal combustion engine 60, and without increasing the fuel (or oil) injection amount, such that the fuel is burned completely, thereby preventing the internal combustion engine 60 from producing carbon deposit, and thereby enhancing the working efficiency of the internal combustion engine 60. Further, the car travels a longer distance under the same fuel volume, so as to achieve the energy-saving purpose. Further, the fuel economizer is assembled easily, quickly, and conveniently, so that the user can assemble and mount the fuel economizer by himself/herself.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A fuel economizer for an internal combustion engine, comprising:

a computer assembly, a battery, an operation setting system, a lead sensing fan, and an air intake fan motor; wherein:

the computer assembly includes an IC (integrated circuit) board;

the IC board of the computer assembly is electrically connected with the battery, the operation setting system, the lead sensing fan, and the air intake fan motor;

the battery provides an electric power to the air intake fan motor;

the operation setting system includes an operation setting monitor;

the operation setting monitor of the operation setting system presets a plurality of grades according to a rotation speed of the lead sensing fan and an air flow rate of the air intake fan motor;

the rotation speed of the lead sensing fan is proportion to a speed of a traffic vehicle;

the operation setting system is provided with a manual/auto switching button, an increase button, and a decrease button;

the operation setting system presets that a rotation speed of the air intake fan motor increases the air flow rate of the air intake fan motor by a grade when the speed of the traffic vehicle is increased by a predetermined value;

the air intake fan motor is connected to an air inlet port of the internal combustion engine;

the air intake fan motor drives and rotates an air intake fan, to control an air flow rate of the air inlet port of the internal combustion engine;

the lead sensing fan is mounted on a front position of the traffic vehicle;

the lead sensing fan includes an IC (integrated circuit) chip;

the IC chip of the lead sensing fan is electrically connected with the IC board of the computer assembly;

the lead sensing fan is rotated during movement of the traffic vehicle; and when the rotation speed of the lead sensing fan reaches a preset value, the IC chip of the lead sensing fan transmits a signal to the computer assembly, and the computer assembly regulates the rotation speed of the air intake fan motor according to a speed grade preset by the operation setting system so as to control the air flow rate of the air inlet port of the internal combustion engine.

2. The fuel economizer for an internal combustion engine as claimed in claim 1, wherein the traffic vehicle is a car.

3. The fuel economizer for an internal combustion engine as claimed in claim 1, wherein the traffic vehicle is a ship.

4. The fuel economizer for an internal combustion engine as claimed in claim 1, wherein:

the lead sensing fan is mounted in a fixture; and the fixture is mounted on a front bumper or a hood of the traffic vehicle.

5. The fuel economizer for an internal combustion engine as claimed in claim 1, wherein the operation setting monitor of the operation setting system presets that the rotation speed of the air intake fan motor increases the air flow rate by a grade when the speed of the traffic vehicle is increased by ten kilometers per hour (10 km/hr).

6. The fuel economizer for an internal combustion engine as claimed in claim 1, wherein the operation setting monitor of the operation setting system presets that the rotation speed of the air intake fan motor increases the air flow rate by a grade when the speed of the traffic vehicle is increased by fifteen kilometers per hour (15 km/hr).

* * * * *